United States Patent [19]

Berruyer

[11] Patent Number: 4,855,941

[45] Date of Patent: Aug. 8, 1989

[54] PROCESS FOR COMPRESSION OF A DATA SET

[76] Inventor: Yves Berruyer, 94, Boulevard Gabriel Peri, 92240 Malakoff, France

[21] Appl. No.: 37,022

[22] Filed: Apr. 10, 1987

[30] Foreign Application Priority Data

Apr. 10, 1986 [FR] France ................................ 86 05139

[51] Int. Cl.$^4$ .......................... G06F 15/48; H04R 1/00
[52] U.S. Cl. .................................... 364/550; 340/909; 364/554; 364/578; 379/112; 379/113
[58] Field of Search ............... 364/467, 493, 550, 554, 364/578; 340/524, 511, 825.06, 909; 379/112, 113, 131, 132, 221; 370/80, 104; 455/12, 17

[56] References Cited

U.S. PATENT DOCUMENTS

| | | | |
|---|---|---|---|
| 4,165,447 | 8/1979 | Bertoglio et al. | 379/112 |
| 4,263,482 | 4/1981 | Serres et al. | 379/113 |
| 4,270,024 | 5/1981 | Theis et al. | 379/113 |
| 4,399,332 | 8/1983 | Furlan et al. | 379/113 |

FOREIGN PATENT DOCUMENTS 2169476 7/1986 United Kingdom ................ 379/113

OTHER PUBLICATIONS

Commutation & Transmission (Paris), No. 2 (Jun. 1983), "Aromat Telephone Call Monitoring and Recording Equipment", G. Dael et al., pp. 39–52.

Primary Examiner—Parshotam S. Lall
Assistant Examiner—Kevin J. Teska
Attorney, Agent, or Firm—Oblon, Spivak, McClelland, Maier & Neustadt

[57] ABSTRACT

Process for compression of a data set.

This process is characterized in that, on the one hand, it consists in creating a library of profile models, each profile model comprising n values called reference values, and, on the other hand, in comparing said measured profile with each profile model to determine a distance between said measured profile and each profile model, in comparing said distance with a first threshold, and in replacing said measured profile with a pair of values, the first value containing a reference to a profile model for which the distance between this profile model and the measured profile is less than said threshold and the second value being representative of the ratio of amplitudes of the measured profile and of said profile model.

12 Claims, 5 Drawing Sheets

PROCESS FOR COMPRESSION OF A DATA SET

BACKGROUND OF THE INVENTION

This invention has as its object a process for compression of a data set corresponding to successive measurements of the same physical magnitude over a predetermined period. The invention relates to any quantifiable activity that varies over time, regularly measured, and relatively often, for example every hour.

The analysis of the successive values of the magnitude measured, for example to determine daily, weekly, or other cycles, by a human operator quickly becomes impossible considering the volume of measured values. The latter are therefore unusable.

The number of magnitudes measured is particularly great in a telephone system. A telephone system is composed of nodes, consisting of automatic through switches or subscriber automatic switches, and connections between these nodes, consisting of beams. For a good management of the resources of the system, it is important to know the load level of each element of this system. Therefore, traffic measurements on each beam and traffic measurements of the automatic switches are regularly made, for example, every half hour or every hour.

More specifically, for a subscriber automatic switch, the outgoing traffic (corresponding to the calls of the subscribers connected to this automatic switch), the incoming traffic (corresponding to calls intended for subscribers connected to the automatic switch), internal traffic (corresponding to a telephone call between two subscribers of the automatic switch), or the like are measured. The data measured is stored in a computer and is published either periodically or on demand.

The publication of the set of data measured on a single automatic switch for a month represents a hundred or so pages. Obviously, it is too large a volume of data for a human operator to be able to use this data. It is therefore necessary to compress the stored data before presenting it to a human operator.

In the particular case of the observations of traffic in a telephone system, a process is used, according to the known art, of rough filtering based on the computation of a monthly representative value and of an annual representative value of each magnitude measured. These values make possible a very significant compression of the measured data but preclude any fine analysis of a magnitude measured, for example the study of daily or weekly cycles.

SUMMARY OF THE INVENTION

The invention has as its object to make possible a synthetic representation of a data set representing successive values of a magnitude that changes over time, to make possible the use of this data by a human operator and to facilitate human decisionmaking, for example, in the case of an automatic through switch of a telephone system, to manage the routing table in this automatic switch.

According to the invention, the compression of a data set consisting of n successive measurements of a signal representative of a traffic load at a determined place in a telecommunication network over a first predetermined period, the set of said measurements being called measured profile, consists, on the one hand, in creating a library of profile models, each profile model comprising n values called reference values, and, on the other hand, in comparing said measured profile with each profile model to determine a distance between said measured profile and each profile model, in comparing said distance with a first threshold, and in replacing said measured profile with a pair of values, the first value containing a reference to a profile model for which the distance between this profile model and the measured profile is less than said threshold and the second value being representative of the ratio of the amplitudes of the measured profile and of said profile model.

The invention is directed to the processing of a signal representative of a traffic load at a determined place in a telecommunication network. It is directed to a telephone network, but also to data transmission network or video signal transmission network. The processed signal can represent a traffic load in a node of the network, the traffic load on a junction between two nodes, the traffic load on a subset of this junction, corresponding to a determined direction, the length of a queue between process in a processing circuit in a node, and more generally to any signal which is representative of a traffic load at a determined place in a telecommunication network.

The level of compression obtained can be very significant. For example, for the measurement of a physical magnitude every hour over a period of 24 hours, the compression process of the invention makes it possible to replace 24 measurements with two values.

Preferably, each profile model of the library is normalized and each measured profile is normalized in the same way before being compared with the profile models.

According to a secondary characteristic, for all normalized profiles (measured or models), the same normalized level is assigned to the highest value of the non-normalized profile.

According to another secondary characteristic, for all normalized profiles (measured or models), the same normalized level is assigned to a value of determined rank of the successive values forming the non-normalized profile.

Preferably, the second value of the pair of values replacing a measured profile is equal to the weight of the measured profile before normalization, i.e., to the sum of the measured values.

According to a variant, the second value of the pair of values replacing a measured profile is equal to the weight of a value of determined rank of the successive values forming the measured profile.

The invention relates also to the compression of a data set represented by successive measurements of the same physical magnitude over a second predetermined period, a multiple of the first predetermined period. These first and second periods are, for example, respectively equal to one day and one week.

The compression of the measured profile over the second predetermined period is performed by replacing this profile with a pair of values comprising a first value identifying a profile model for the second predetermined period by a set of profile models contained in a library, and a second value expressing a ratio of the amplitudes between said measured profile and the profile model designed by the first value.

According to a first preferred variant, a profile model for the second predetermined period is composed of p pairs of values, where p is the period ratio between the second predetermined period and the first predetermined period, each pair being composed of an identifier designating a profile model for the first predetermined period and of a value expressing the weight of said profile model for the first predetermined period in the profile model for the second predetermined period.

According to a second preferred variant, a profile model for the second predetermined period is composed of the name of a rate followed, and of the p values of this rate in each of the p first predetermined periods. The rate can, for example, be the minimum value, the maximum value, or other of the physical magnitude over the first predetermined period.

BRIEF DESCRIPTION OF THE DRAWINGS

The characteristics and advantages of the invention will come out from the following description, given by way of illustration, but in a nonlimiting way, with reference to the accompanying drawings in which.

DETAILED DESCRIPTION OF THE PREFERRED EMBODIMENTS

Figure 1:
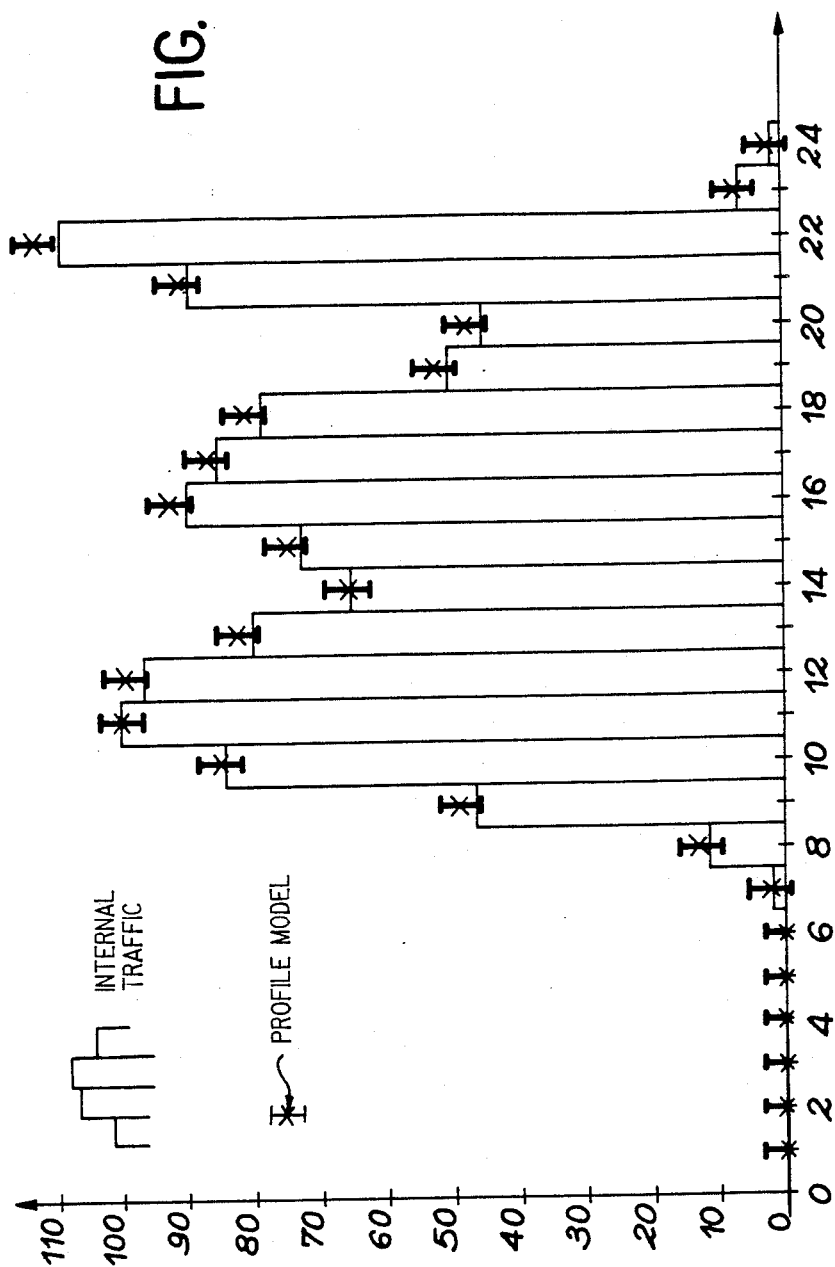
FIG. 1 is a graph on which are represented the measured profile corresponding to the internal traffic of an automatic switch over one day, and a profile model, said graph making it possible to evaluate the distance between the measured profile and the profile model.

Generally, the process of the invention consists in replacing a volume of data corresponding to successive measurements of the same physical magnitude over a predetermined period with a smaller number of data without there being an appreciable loss of information. The process consists mainly in comparing a measured profile, i.e., a series of measurements made on a physical magnitude, with profile models Aj contained in a library. These profile models are characteristic profiles of the values of the physical magnitude to be analyzed. They can be created either by computation, or by experimental measurements on this physical magnitude.

The predetermined period associated with a profile depends on the physical magnitude measured and on the analysis that it is desired to perform. In many cases, this period can be linked to a cycle of human activity. The predetermined period can then be equal to a day, a week, a month, a season or a year. It can also have the period of a lunar, solar, or similar cycle.

By way of example, the case of a subscriber automatic switch in a telephone system will be considered, in which the physical magnitudes measured are:
  the internal traffic, i.e., the communications between two subscribers connected to the automatic switch,
  the outgoing traffic, i.e., the communications demanded a subscribers connected to the automatic switch, with a subscriber connected to another automatic switch,
  the incoming traffic, i.e., the communications demanded a subscriber connected to another automatic switch, with a subscriber connected to the automatic switch,
  the total traffic, equal to the sum of the internal, outgoing and incoming traffic.

By way of example, a predetermined period equal to a day is chosen, the measurements being made every hour.

The process of the invention consists in replacing each measured profile, i.e., each set of 24 hourly values, with only two values: a value to designate the profile model of a profile $A_j$ library closest to the measured profile, and another value B to express a ratio between the amplitudes of the values of the measured profile and the amplitudes of the reference values of the profile model.

The use of the process of the invention, therefore, necessitates the constituting of a profile model library. In the case of the example chosen, the amplitude of the measured values and the distribution of the values of high amplitude depends considerably on the day of the measurement. Actually, it is quite clear that the number of telephone communications depends on the economic activity and is therefore not the same, for example, at the beginning of the week or during the weekend.

The library of profile models can therefore advantageously, in this case, comprise several models of particular profiles for each day of the week; models $A_j$, where $j=1$, k each of n values. These models of profiles are, for example, obtained experimentally, and by averaging several experimental profiles. The library of models of profiles can also include models of particular profiles to take into account certain types of days which are known, through experience, to lead to specific profiles. This is the case, for example, for public holidays.

The library of models of profiles being created, to use the process of the invention it remains to define the criteria of distance which is used to compare a measured profile ($VM_i$, $i=1$, n) with the profile model of the library. This comparison must be preceded by a normalization stage of the measured profile so that the comparison is not distorted by differences of scale between the measured profile and the profile models.

The profile models are normalized when they are entered into the library. This normalization consists, for example, in assigning the level 100 to a particular value of the profile and in expressing the other values of this profile in the form of a percentage of this value.

The particular value selected can be the value of highest amplitude of the profile. In this case, all the other values of the profile have a level between 0 and 100. A variant consists in selecting, as a particular value, the ith value of the series of values constituting the profile, where i is a predetermined number between 1 and 24. With this selection, the particular value whose level, by definition, is equal to 100, is not necessarily the value of highest amplitude.

In the following description of the process of the invention, this variant is used, by way of example, to normalize the models of profiles and the measured profiles.

The locating of the profile model closest to a measured profile consists in measuring the distance $|VR_i - VM_i|$ between said measured profile and each profile model $A_j$ according to a criterion of predetermined distance. Generally, the distance between the measured profile and a profile model is a function of the deviation between each measured value of the measured profile and the corresponding reference value of the profile model.

A possible criterion for deciding that a measured profile is similar to a profile model is to verify that each deviation is less than a fixed threshold. The latter can be independent of the reference value. It then is a matter of verifying the inequality $|VR-RM| \leq T$, where VR is a value of the profile model, VM the corresponding measured value and T the threshold. Variables VR and VM are normalized and, therefore, are between 0 and 100. The value of T is several units.

According to a variant, the threshold can be a function of the value of the profile model, for example if the inequality to be verified is: $|VR-VM| \leq T \times VR/100$.

In the two preceding inequalities, tolerance T is independent of the level of reference value VR. But the range [0,100] of value for reference value VR can also be, for example, broken down into a lower range, an intermediate range and an upper range, tolerance T being different for each range.

Finally, the comparison between the measured profile and a profile model can also take into account the deviation between the weight of the measured profile, i.e., the sum of the measured values, and the weight of the profile model. The measured profile and the profile model are similar if the deviation between the weights of the normalized profiles is less than a predetermined threshold.

The compression of data corresponding to the traffic of an automatic switch will now be described, by way of example, in relation to FIGS. 1 to 5. In table I, the internal, outgoing, incoming and total traffic of a subscriber automatic switch has been shown. For each traffic, the number of tenths of erlang during each hour over a period of 24 hours has been noted.

In table II, there has been noted in the same manner a profile model corresponding to a typical traffic for a subscriber automatic switch. This profile model was normalized by taking as a base the 11th value whose level was fixed at the value 100.

So that a comparison between the profile model and each measured profile could be achieved, each measured profile was normalized in the same manner as the profile model. The level 100 was therefore assigned to the 11th value of each measured profile. The normalized measured profiles are represented in table III.

The profile model indicated in table II and the normalized measured profiles indicated in table III are compared in FIGS. 1 to 5, respectively. In each of these figures, each measured value is located in relation to an interval centered on the corresponding reference value and having a width of 6 units. Thus, when the measured value is in this interval, it means that the deviation between measured value VM and reference value VR is, in absolute value, less than a threshold equal to three units.

In the examples represented in FIGS. 1 to 5, this threshold is constant. It does not depend on the level of the reference value.

It is found that each value of the normalized measured profile of the internal traffic, represented in FIG. 1, is found in the interval centered on the corresponding reference value of the profile model, with the exception of the 22nd value. It is the same for the normalized measured profile of the total traffic represented in FIG. 4.

Figure 2:
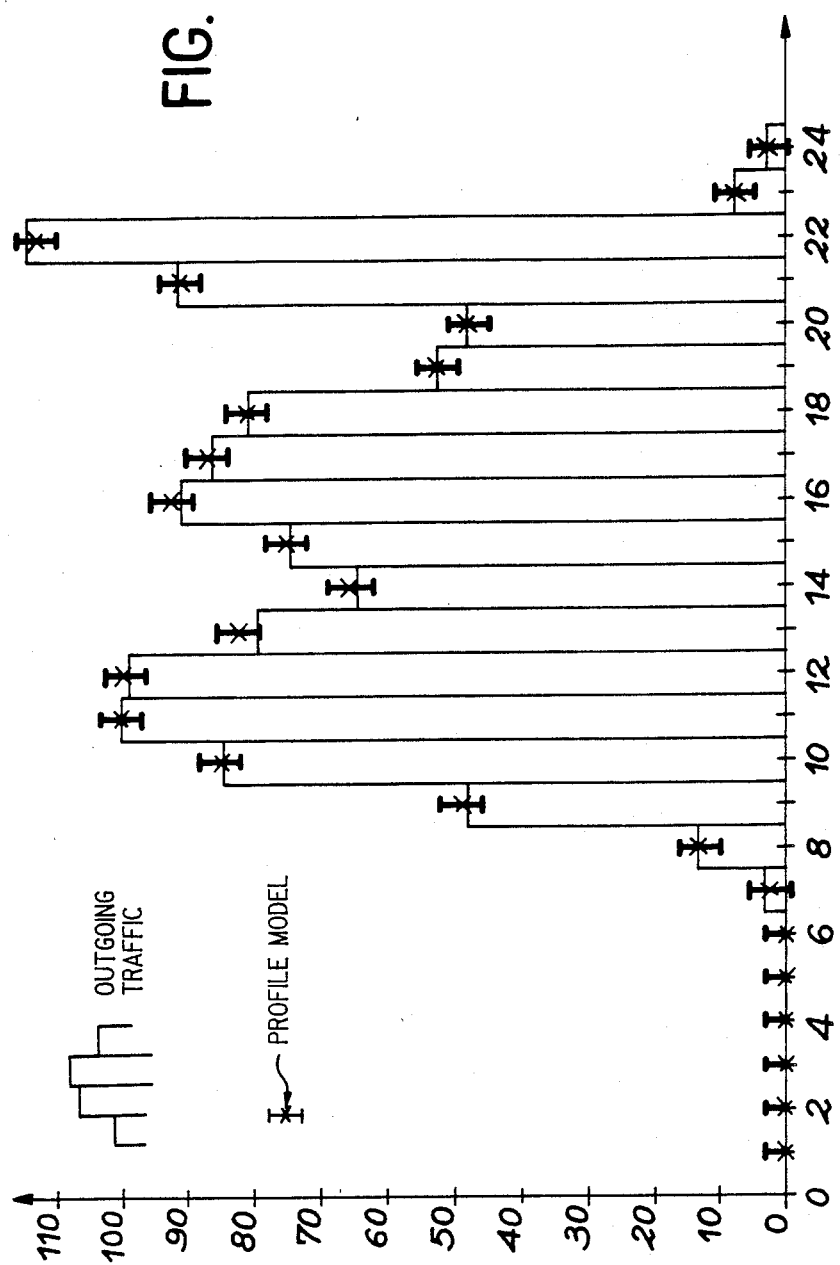
FIG. 2 is a graph similar to that of FIG. 1, in which the measured profile corresponds to the outgoing traffic of an automatic switch.
Figure 3:
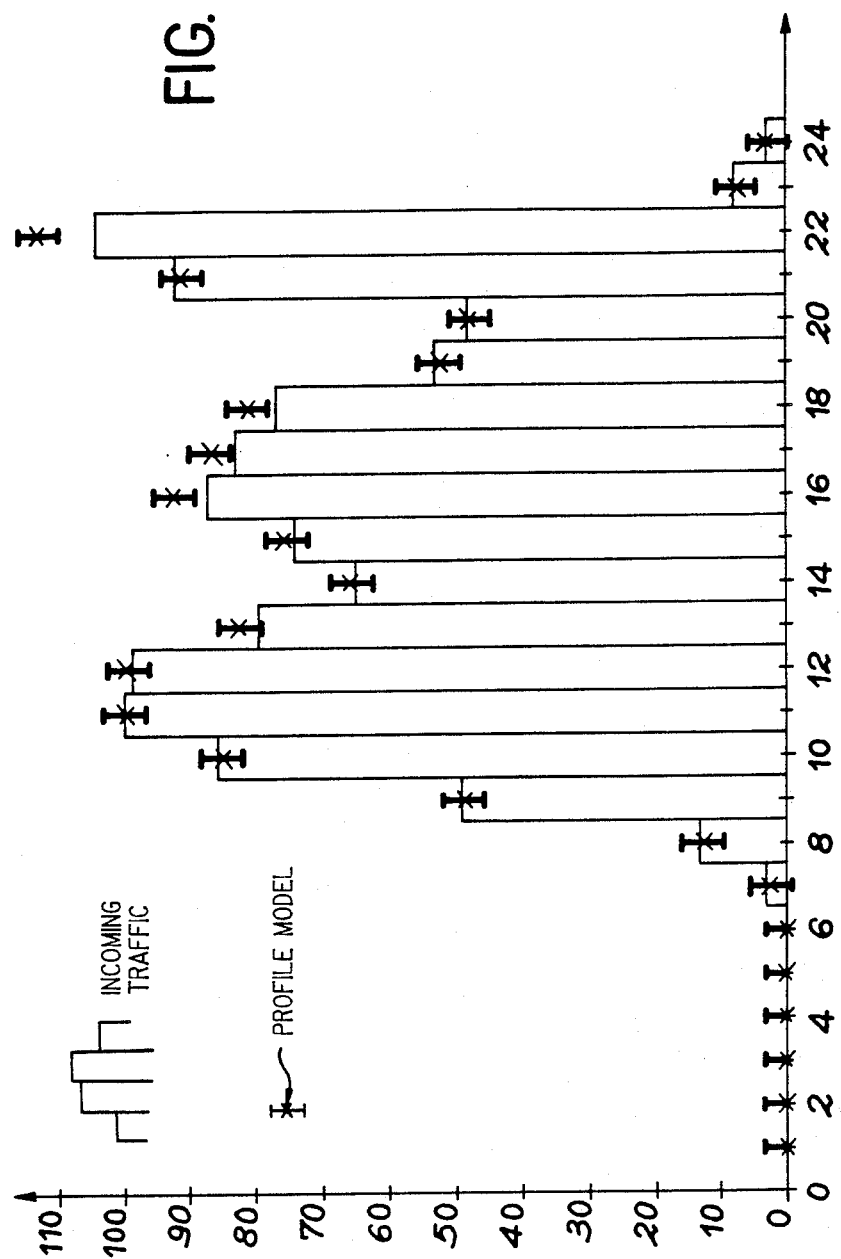
FIG. 3 is a graph similar to that of FIG. 1 in which the measured profile corresponds to the incoming traffic of an automatic switch.
Figure 4:
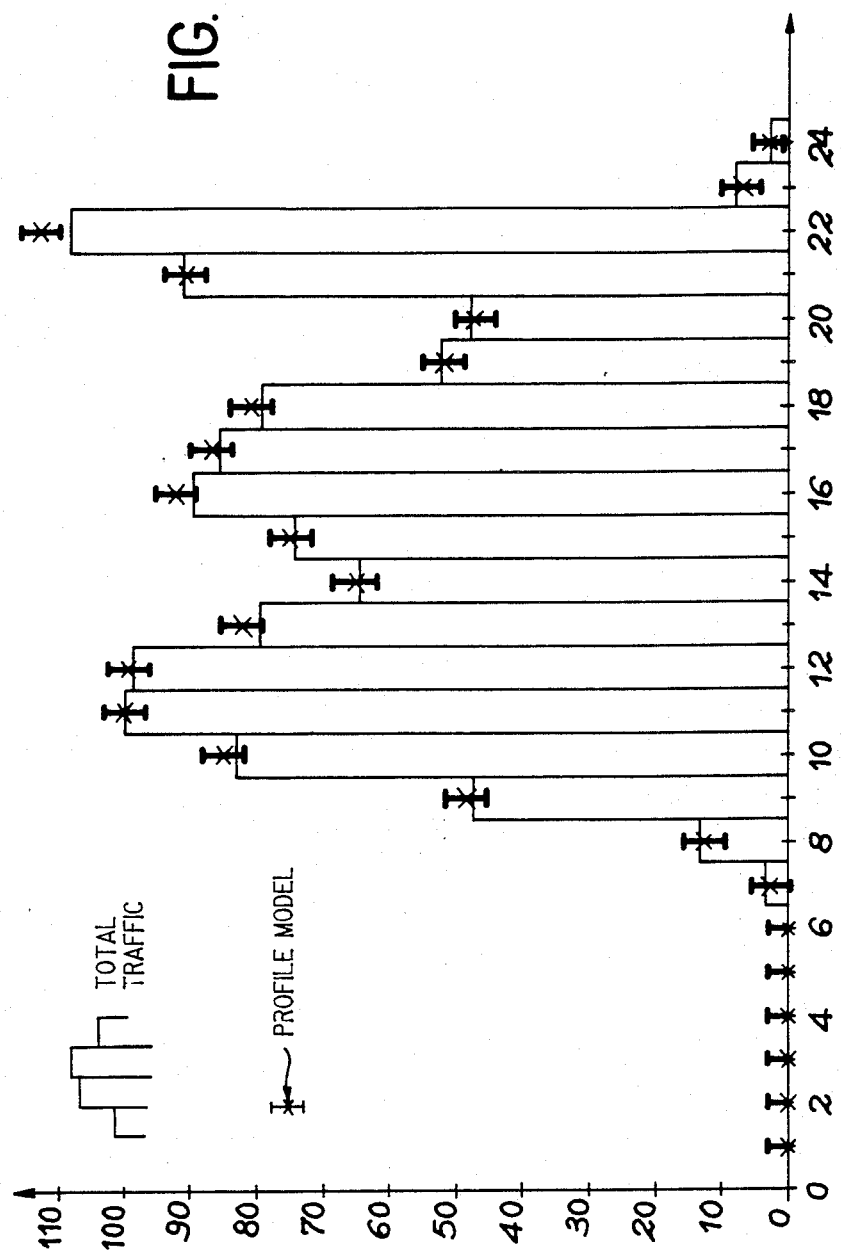
FIG. 4 is a graph similar to that of FIG. 1 in which the measured profile corresponds to the total traffic of an automatic switch and FIG. 5 is a flow chart showing the steps of the invention.
Figure 5:
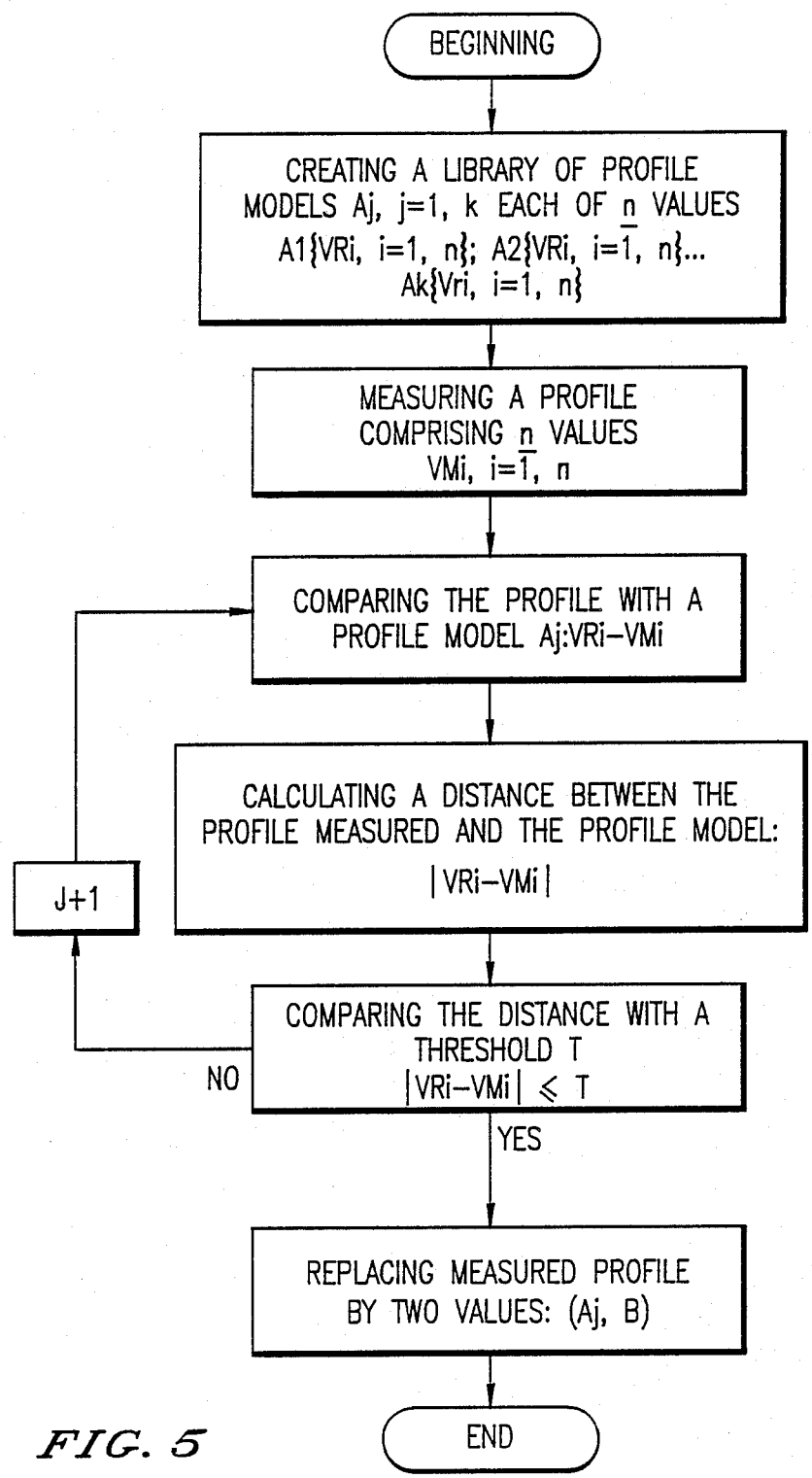

For the outgoing traffic, whose measured profile is represented in FIG. 2, each measured value is found in the interval centered on the corresponding reference value of the profile model. Finally, for the incoming traffic, represented in FIG. 3, the 16th, 17th, 18th and 22nd values are found outside of the intervals centered on the corresponding reference values of the profile model.

The measured profile corresponding to the outgoing traffic of the automatic switch (FIG. 2) is according to the profile model. It can therefore be coded with two values, one Aj noting the reference number of the profile model, and the other B expressing the ratio between the amplitude of the non-normalized measured profile and the amplitude of the normalized profile model. This other value B can, for example, be the weight of the non-normalized measured profile, i.e., the sum of the values constituting the profile; the weight of the value of the non-normalized measured profile corresponding to the value taken as base (i.e., whose level or weight is equal to 100) in the normalized profile model; or the ratio between the weight of the measured profile and the weight of the normalized profile model.

For the internal traffic and for the total traffic of the automatic switch, a distortion between the normalized measured profile and the profile model exists only for the 22nd value. It can be noted that this value is special because it corresponds to a peak of traffic whose level is greater than 100.

It can be selected to take into account or not to take into account these traffic peaks during the comparison of a measured profile with a profile model. Actually, it can be considered that the traffic peaks correspond to special events which are not representative of the general pattern of the magnitude measured. It can then be decided that the traffic peaks are not taken into account in the comparison of the measured profile with the profile model.

In this case, the measured profiles corresponding to the internal traffic and to the total traffic of the automatic switch (FIGS. 1 and 4) are each according to the profile model. They can then be coded in the same way as the profile representing the internal traffic of the automatic switch.

The incoming traffic of the automatic switch (FIG. 3) cannot be coded in the same way because values 16, 17 and 18 of the measured profile do not coincide with the corresponding values of the profile model. If this distortion exists between the incoming traffic and each profile model of the library, the storage of the measured profile then necessitates the storage of each measured value.

However, if this measured profile deviates remarkably from the profile models contained in the library and with which it has been compared, it can be advantageous to retain this measured profile as a new profile model. It is then added to the library and, moreover, can be coded in the same manner as the other measured profiles.

In the preceding description, the library contains profile models which correspond to possible profiles for a physical magnitude over a predetermined period equal to one day as a first predetermined period. These profile models can also be used advantageously to define weekly profile models, or generaly profile models for any second predetermined period that is a multiple of a day.

The weekly profile models can be defined by reference to the daily profile models, for example, in the form of 7 pairs, each pair consisting of a reference to a daily profile model and of a value indicating the ratio of amplitude between the daily profile contained in the weekly profile and the normalized profile model contained in the library. This value, for example, can be the real weight of a weekly profile model whose corresponding reference value in the daily normalized profile model has a level equal to 100.

In this way, the coding of the measured values of a physical magnitude over a period of a week can be reduced to only two values: a reference to a weekly profile model and a value representing the ratio between the amplitudes of the weekly measured profile and of the weekly profile model.

This is achieved by a coding in two stages, the first stage making it possible to replace each daily measured profile with a reference to a daily profile model and to a weight, the second making it possible to replace the set of the 7 daily pairs with a single pair comprising a reference to a weekly profile model and a weight.

The weekly models of profiles can also be defined by the daily value, for each day of the week, of a predetermined parameter. This parameter can, for example, be the minimum value of the physical magnitude during the day, the maximum value of the physical magnitude during the day, or the like.

The weekly profile model then comprises 7 values to which are added an identifier to designate the parameter considered.

The comparison of a weekly measured profile with a weekly profile model consists, in this case, in comparing, for each day of the week, the value of the parameter in the weekly profile model and the measured value of this parameter.

The invention has been described with reference to measurements of traffic on an automatic switch made over periods of one day and of one week. However, it is well understood that the invention is not linked to the nature of the physical magnitude measured nor to the period of measurement of this magnitude.

TABLE I

| hours | internal traffic | outgoing traffic | incoming traffic | total traffic |
|---|---|---|---|---|
| 1 | 0 | 2 | 1 | 3 |
| 2 | 0 | 1 | 1 | 2 |
| 3 | 0 | 0 | 0 | 0 |
| 4 | 1 | 0 | 1 | 2 |
| 5 | 0 | 1 | 1 | 2 |
| 6 | 1 | 12 | 11 | 24 |
| 7 | 4 | 109 | 106 | 219 |
| 8 | 24 | 513 | 491 | 1028 |
| 9 | 96 | 1937 | 1862 | 3895 |
| 10 | 178 | 3422 | 3283 | 6883 |
| 11 | 211 | 4050 | 3847 | 8108 |
| 12 | 203 | 3986 | 3789 | 7978 |
| 13 | 169 | 3239 | 3076 | 6484 |
| 14 | 137 | 2616 | 2501 | 5254 |
| 15 | 154 | 3012 | 2847 | 6013 |
| 16 | 189 | 3720 | 3326 | 7235 |
| 17 | 180 | 3518 | 3207 | 6905 |
| 18 | 166 | 3280 | 2959 | 6405 |
| 19 | 106 | 2117 | 2042 | 4265 |
| 20 | 94 | 1913 | 1838 | 3845 |
| 21 | 188 | 3692 | 3532 | 7412 |
| 22 | 231 | 4527 | 4019 | 8777 |
| 23 | 13 | 295 | 291 | 599 |
| 24 | 3 | 83 | 87 | 173 |
| WEIGHT pounds | 2348 | 46045 | 43118 | 91511 |

TABLE II

| hour | profile model |
|---|---|
| 1 | 0 |
| 2 | 0 |
| 3 | 0 |
| 4 | 0 |
| 5 | 0 |
| 6 | 0 |
| 7 | 2 |
| 8 | 12 |
| 9 | 48 |
| 10 | 85 |
| 11 | 100 |
| 12 | 99 |
| 13 | 82 |
| 14 | 65 |
| 15 | 75 |
| 16 | 92 |
| 17 | 87 |
| 18 | 81 |
| 19 | 52 |
| 20 | 47 |
| 21 | 91 |
| 22 | 113 |
| 23 | 7 |
| 24 | 2 |

TABLE III

| hours | internal traffic | outgoing traffic | incoming traffic | total traffic |
|---|---|---|---|---|
| 1 | 0 | 0 | 0 | 0 |
| 2 | 0 | 0 | 0 | 0 |
| 3 | 0 | 0 | 0 | 0 |
| 4 | 0 | 0 | 0 | 0 |
| 5 | 0 | 0 | 0 | 0 |
| 6 | 0 | 0 | 0 | 0 |
| 7 | 2 | 2 | 3 | 3 |
| 8 | 11 | 13 | 13 | 13 |
| 9 | 45 | 48 | 48 | 48 |
| 10 | 84 | 84 | 85 | 85 |
| 11 | 100 | 100 | 100 | 100 |
| 12 | 96 | 98 | 98 | 98 |
| 13 | 80 | 80 | 80 | 80 |
| 14 | 65 | 65 | 65 | 65 |
| 15 | 73 | 74 | 74 | 74 |
| 16 | 90 | 92 | 86 | 89 |
| 17 | 85 | 87 | 83 | 85 |
| 18 | 79 | 81 | 77 | 79 |
| 19 | 50 | 52 | 53 | 53 |
| 20 | 45 | 47 | 48 | 47 |
| 21 | 89 | 91 | 92 | 91 |
| 22 | 109 | 112 | 104 | 108 |
| 23 | 6 | 7 | 8 | 7 |
| 24 | 1 | 2 | 2 | 2 |

What is claimed as new and desired to be secured by Letters Patent of the United States is:

1. Process of compression of a data set formed from successive measurements of a signal representative of a traffic load at a determined place in a telecommunication network over a first predetermined period, the set of said measurements being called a measured profile, comprising the steps of creating a library of profile models, each profile model comprising n values called reference values comparing said measured profile with each profile model to determine a distance between said measured profile and each profile model, comparing said distance to a first threshold, and replacing said measured profile with a pair of values, the first value containing a reference to a profile model for which the distance between this profile model and the measured profile is less than said threshold and the second value being representative of the ratio of the amplitudes of the measured profile to the amplitudes of said profile model.

2. Process according to claim 1, wherein the second value of the pair of values replacing a measured profile is equal to the sum of the measurements forming a measured profile before normalization.

3. Process according to claim 1, wherein the second value of the pair of values replacing a measured profile is equal to a weight of a value of determined rank of the successive measurements forming the measured profile.

4. Process according to claim 1, wherein there is further created a library of profile models for a second predetermined period, a multiple of the first predetermined period, wherein said signal representative of the traffic load at said predetermined place in said telecommunication network is measured over a second predetermined period and wherein the measured profile over the second predetermined period is replaced with a pair of values, in which a first value designates a reference to a profile model for the second predetermined period for which a distance between this profile model and the measured profile is less than a threshold and in which the second value is representative of the ratio of the amplitudes of the measured profile and of said profile model.

5. Process according to claim 4, wherein each profile model for the second predetermined period is composed of p pair of values, where p is the period ratio between the second predetermined period and the first predetermined period, each pair being composed of an identifier designating a profile model for the first predetermined period and of a value expressing the weight of said profile model for the first predetermined period in the profile model for the second predetermined period.

6. Process according to claim 4, wherein each profile model for the second predetermined period is composed of a name of a rate followed, and of the p values of this rate in each of the p first predetermined periods.

7. Process according to claim 1, wherein each profile model of the library is normalized and each measured profile is normalized in the same way before being compared with the profile models.

8. Process according to claim 7, wherein for all measured and model normalized profiles, the same normalized level is assigned to the highest value of the non-normalized measured and model profiles.

9. Process according to claim 7, wherein for all measured and model normalized profiles, the same normalized level is assigned to a value of determined rank of the successive values forming the non-normalized measured and model profiles.

10. Process according to claim 7, wherein the comparison between a measured profile and a profile model consists in measuring the deviation between each value of the measured profile and the reference value of the same rank as the profile model.

11. Process according to claim 10, wherein the distance between the measured profile and the profile model is less than the first threshold if each deviation is less than a predetermined second threshold.

12. Process according to claim 11, wherein the second threshold is a function of the weight of the reference value which is compared with a measured value.

* * * * *